United States Patent [19]

Swain et al.

[11] Patent Number: 5,433,572
[45] Date of Patent: Jul. 18, 1995

[54] AUTOMATED SUBSTRATE LOADING AND PHOTORECEPTOR UNLOADING SYSTEM

[75] Inventors: Eugene A. Swain; Henry T. Mastalski, both of Webster, N.Y.

[73] Assignee: Xerox Corporation, Stamford, Conn.

[21] Appl. No.: 933,647

[22] Filed: Aug. 24, 1992

[51] Int. Cl.⁶ .............................................. B65G 57/20
[52] U.S. Cl. .................................... 414/27; 414/778; 414/908; 414/910
[58] Field of Search ................... 414/27, 908, 910, 778

[56] References Cited

U.S. PATENT DOCUMENTS

| | | | |
|---|---|---|---|
| 3,195,444 | 7/1965 | McLean | 414/27 X |
| 4,337,719 | 7/1982 | Vander Griendt et al. | 118/46 |
| 4,456,417 | 6/1984 | Gerding | 414/22 |
| 4,596,505 | 6/1986 | Seelinger | 414/27 |
| 4,988,252 | 1/1991 | Yamamoto et al. | 414/911 X |
| 4,998,857 | 3/1991 | Paravella et al. | 414/908 X |
| 5,032,052 | 7/1991 | Swain | 414/222 |
| 5,037,676 | 8/1991 | Petrapoulos et al. | 427/294 |
| 5,038,707 | 8/1991 | Swain et al. | 118/58 |
| 5,074,735 | 12/1991 | Stock | 414/27 |
| 5,076,750 | 12/1991 | Mandotti | 414/222 |
| 5,076,751 | 12/1991 | Kafka | 414/282 |
| 5,079,854 | 1/1992 | Hammond et al. | 34/187 |
| 5,090,350 | 2/1992 | Hammond et al. | 118/50 |
| 5,169,271 | 12/1992 | Yamashita | 414/908 X |

*Primary Examiner*—Michael S. Huppert
*Assistant Examiner*—Janice L. Krizek
*Attorney, Agent, or Firm*—Gary G. Heffernan; Zosan S. Soong

[57] ABSTRACT

A system for loading a plurality of cylindrical members, initially oriented to longitudinally extend in a first direction, into a processing module adapted to receive the plurality of cylindrical members longitudinally extending in a second direction, is disclosed. The system is particularly adapted for use in a rotary atomization manufacturing system for manufacturing photoreceptors from the cylindrical member in the form of substrate members. The system includes a first support structure for receiving and retaining removably thereon the plurality of cylindrical members oriented to longitudinally extend in the first direction. The system transfers the plurality of cylindrical members, longitudinally extending in the first direction, to the first support structure. The system includes a second support structure for receiving and retaining removably thereon the plurality of cylindrical members oriented to longitudinally extend in the second direction. The system moves the first support structure from the first position to a second position, the first support structure in the first position orienting the plurality of cylindrical members to longitudinally extend in the first direction, the first support structure in the second position orienting the plurality of cylindrical members to longitudinally extend in the second direction, transverse to the first direction, in alignment with the second support structure. The system transfers substantially simultaneously the plurality of cylindrical members from the first support structure to the second support structure. The system transfers substantially simultaneously the plurality of cylindrical members from the second support structure to the processing module.

17 Claims, 5 Drawing Sheets

AUTOMATED SUBSTRATE LOADING AND PHOTORECEPTOR UNLOADING SYSTEM

BACKGROUND OF THE INVENTION

1. Field of the Invention

This invention relates generally to an apparatus for loading, supporting and unloading members, and more specifically, the present invention is directed to an improved automated substrate loading and photoreceptor unloading system for loading, supporting and unloading substrates and collars.

2. Description of the Prior Art

A photoreceptor is a processed substrate, often cylindrical or belt like, used in a xerographic apparatus. The substrate is coated with one or more layers of a photoconductive material, i.e., a material whose electrical conductivity changes upon illumination, to form a photoreceptor.

A vital requirement in assuring high quality images in the xerographic process is that the substrate be properly coated with the photoconductive material. The substrates are often loaded onto a movable support structure which may comprise one or more cylindrical mandrel assemblies supported by the movable support structure. The movable support structure and the substrates carried thereby typically move to several nearby processing stations, such as a cleaning station, a coating station, and a curing or drying station. This enables the substrate to be properly coated with the photoconductive material to form a photoreceptor. The photoreceptors are thereafter unloaded from the movable support structure.

In the fabrication process of the photoreceptors, the length of time for loading uncoated substrates onto the cylindrical mandrel assemblies supported by a movable support structure, adapted to insert the uncoated substrates into a processing station or module, is time inefficient. The movable support structure has to remain in the loading station during the time it takes to individually transfer the substrates to the cylindrical mandrel assemblies supported by the movable support structure. In addition, if the loading of the substrates and the unloading of the photoreceptors are done manually, there exist additional problems. The complicated manual movements, although usually less than a minutes time, are considered time inefficient and result in particulate contamination generated by the motion of the operator. In addition, manual movements are difficult to perform after constant repetition resulting in a decrease in the quality of the loading process during an extended time period. There exists a need for a simple and time efficient system for substrate loading and photoreceptor unloading.

The following disclosures may be relevant to various aspects of the present invention:

U.S. Pat. No. 4,337,719 Patentee: Vander Griendt et al. Issued: Jul. 6, 1982

U.S. Pat. No. 4,456,417 Patentee: Gerding Issued: Jun. 26, 1984

U.S. Pat. No. 5,032,052 Patentee: Swain Issued: Jul. 16, 1991

U.S. Pat. No. 5,037,676 Patentee: Petropoulos et al. Issued: Aug. 6, 1991

U.S. Pat. No. 5,038,707 Patentee: Swain et al. Issued: Aug. 13, 1991

U.S. Pat. No. 5,074,735 Patentee: Stock Issued: Dec. 24, 1991

U.S. Pat. No. 5,076,750 Patentee: Mandotti Issued: Dec. 31, 1991

U.S. Pat. No. 5,076,751 Patentee: Kafka Issued: Dec. 31, 1991

U.S. Pat. No. 5,079,854 Patentee: Hammond et al. Issued: Jan. 14, 1992

U.S. Pat. No. 5,090,350 Patentee: Hammond et al. Issued: Feb. 25, 1992

The relevant portions of the foregoing disclosures may be briefly summarized as follows:

U.S. Pat. No. 5,076,751 discloses a reelroom newsprint roll handling apparatus and method. A conveyor transports a newsprint roll to the roll handling apparatus. The apparatus includes storage and retrieval machines having a roll carrier provided with an intermediate and upper pair of obliquely disposed telescoping arms. The upper pair of arms are equipped with pivoted article engaging pads for cradling engagement with the surface portions of a load disposed thereon. The arms are transversely movable into a plurality of storage bins. Each of the retrieval machines has a base mounted for travel longitudinally along an aisle extending adjacent and parallel to a row of the storage bins, and a vertically movable elevator, mounted to the base and supporting the roll carrier. The storage and retrieval machines independently move the base horizontally, the elevator vertically and the roll carrier transversely. The roll carrier is movable into and out of a selected storage bin to deposit a newsprint roll therein or to remove a newsprint roll therefrom.

U.S. Pat. No. 5,032,052 and U.S. Pat. No. 5,038,707, each disclose a modular apparatus for processing cylindrical and belt-like substrates in a dual planetary array. A transport vehicle is illustrated and described which transports a support structure having a planetary array of support arms carrying a planetary array of substrates thereon into a plurality of processing stations for cleaning, coating, curing, etc. One end of the modular apparatus is illustrated having a plurality of vertically oriented substrates on a flat surface. Loading of the substrates is described as being achievable by a programmed robot arm or manually.

U.S. Pat. No. 5,037,676, U.S. Pat. No. 5,079,854 and U.S. Pat. No. 5,090,350, each disclose a method and an apparatus for manufacturing drum and flexible belt charge receptors. A carousel rotatable to several different surrounding stations, including a substrate loading/unloading station and a plurality of processing stations, is disclosed. The carousel includes a plurality of support mandrels for receiving substrates thereon. Uncoated substrates are loaded onto the planetary array of mandrels either manually or via a programmed robot arm.

U.S. Pat. No. 5,076,750 discloses an apparatus for loading and unloading adhesive tape cores onto an adhesive tape roll making machine. The apparatus slidably receives thereon adhesive tape cores on pivotally mounted guides. The guides pivot in alignment with an adhesive tape roll making machine to slidably deliver the tape cores thereto.

U.S. Pat. No. 5,074,735 discloses a wicket indexed unit for sequentially aligning individual bag stacking units with a bag transfer unit for stacking plastic bags having spaced holes along a given edge portion. A rotatable stud has a plurality of posts extending therefrom. The posts are adapted to be inserted in the holes of the the bags for removing the bags off a conveyor. The stud is then rotated to urge the bags to a desired stacking position.

U.S. Pat. No. 4,337,719 discloses a mandrel support means for use with an apparatus for cylindrical cans. The apparatus is comprised of a circular mandrel wheel having mandrel assemblies mounted transversely on a stationary central shaft. The mandrel assemblies have cam roller ends which communicate with a guiding stationary box cam. A secondary mandrel support is provided adjacent the mandrels mounted on the stationary shaft member. The stationary shaft member is comprised of one or more planar support cams which extend radially from the secondary mandrel support to cammingly engage with the mandrel assemblies.

U.S. Pat. No. 4,456,417 discloses a method and apparatus for loading, aligning and supporting hollow cylinders on a mandrel. The apparatus includes a cam for actuating a bifurcated jaw hinged on a pintle for releasably retaining the cylinders on the mandrel. The apparatus retains the cylinders on the mandrel during a transfer to a vertical position and releases the cylinders on a seat without disrupting the linear alignment or dropping the cylinders.

SUMMARY OF THE INVENTION

In accordance with one aspect of the present invention, there is provided a system for loading a plurality of cylindrical members, initially oriented to longitudinally extend in a first direction, into a processing module adapted to receive the plurality of cylindrical members longitudinally extending in a second direction. First means, oriented in a first position, is provided for receiving and retaining removably thereon the plurality of cylindrical members oriented to longitudinally extend in the first direction. Second means is provided for receiving and retaining removably thereon the plurality of cylindrical members oriented to longitudinally extend in the second direction. First means is provided for transferring the plurality of cylindrical members, longitudinally extending in the first direction, to said first receiving and retaining means. Means is provided for moving said first receiving and retaining means from the first position to a second position, said first receiving and retaining means, in the first position, orienting the plurality of cylindrical members to longitudinally extend in the first direction, said first receiving and retaining means, in the second position, orienting the plurality of cylindrical members to longitudinally extend in the second direction, transverse to the first direction, in alignment with said second receiving and retaining means. Second means is provided for transferring substantially simultaneously the plurality of cylindrical members from said first receiving and retaining means to said second receiving and retaining means. Third means is provided for transferring substantially simultaneously the plurality of cylindrical members from said second receiving and retaining means to the processing module.

Other features of the present invention will become apparent as the description thereof proceeds and upon reference to the drawings.

BRIEF DESCRIPTION OF THE DRAWINGS

In the detailed description of the preferred embodiments of the present invention, reference is made to the accompanying drawings, in which.

In the drawings and the following description, it is to be understood that like numeric designations refer to components of like function.

DETAILED DESCRIPTION OF THE PREFERRED EMBODIMENTS

Although specific terms are used in the following description for the sake of clarity, these terms are intended to refer only to the particular structure of the invention selected for illustration in the drawings, and are not intended to define or limit the scope of the invention.

The present invention provides a system for loading and unloading a member which is particularly adapted for use in the fabrication process of photoreceptors in a rotary atomization manufacturing system. A carrier unit, as described herein, is a transport device which brings one or more members, such as unprocessed substrates, to a processing station, such as a rotary atomizer, and returns processed substrates or photoreceptors therefrom. The loading and unloading system of the present invention accomplishes member transfer to the carrier unit by facilitating orientation change and movement of the members. The embodiments described and illustrated herein are but examples of a wide range of applications consistent with the broad scope of the invention.

Figure 1:
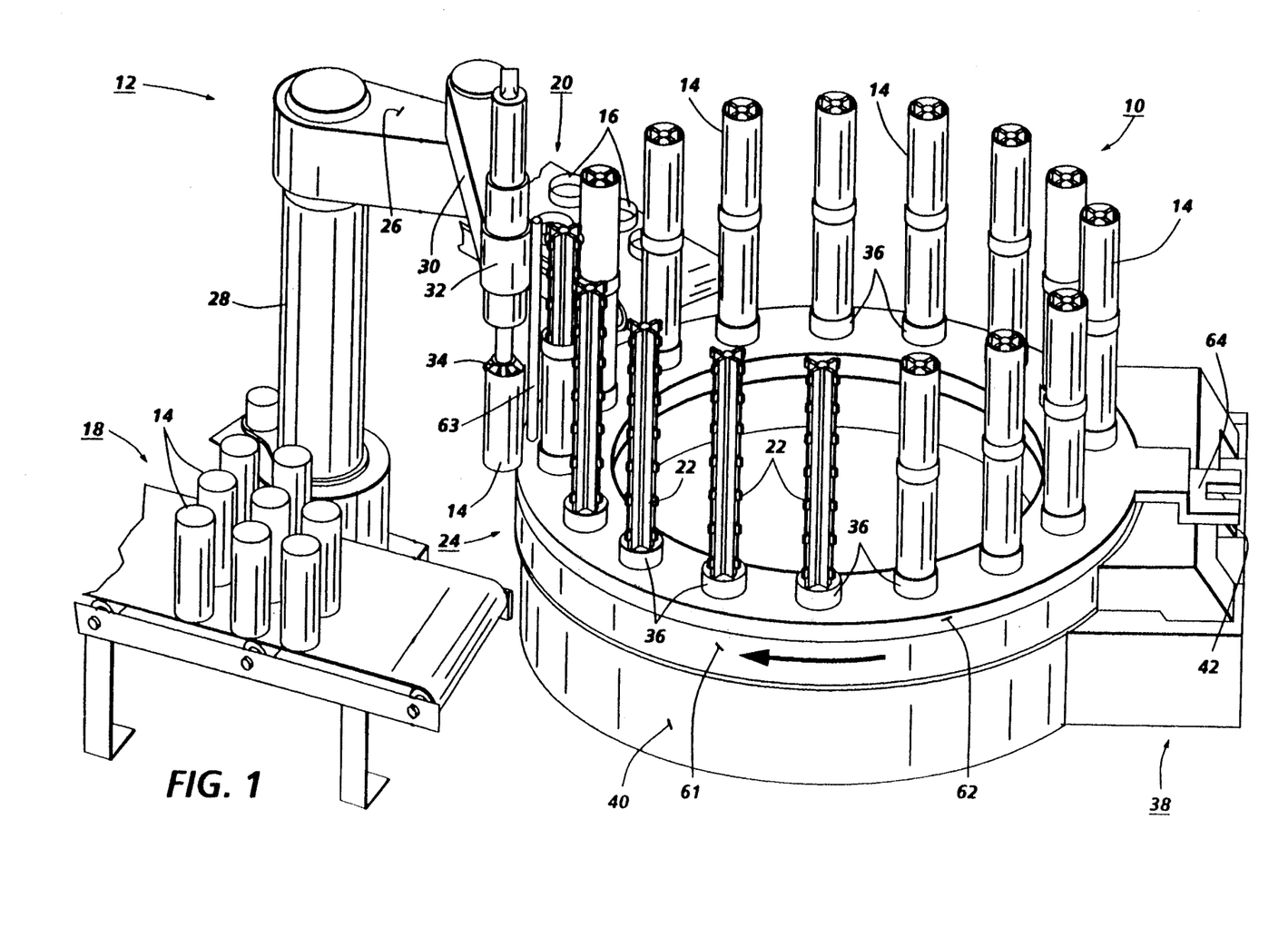
FIG. 1 is a schematic perspective view showing an illustrative automated loading and unloading system for loading and unloading members, such as substrates and collars, incorporating the features of the present invention therein.

Describing now the specific example illustrated in the figures, there is schematically shown in FIG. 1, an automated loading and unloading system 10 for loading and unloading members, and particularly adapted for loading unprocessed substrates and unloading processed substrates transformed into photoreceptors. The substrates 14 may be in the form of cylinders, sleeves, semirigid belts, or other suitable configurations, typically a configuration which defines an opening. A robot 12 is utilized to transfer the members, such as substrates 14 and collars (often referred to as masks) 16, from transporting or conveying systems 18 and 20 onto elongated members in the form of vertically disposed cantilevered shafts 22 indexed in a circular pattern on first receiving and retaining means. The receiving and retaining means may comprise a first support structure such as the illustrative base or loading magazine 24, or the spaced apart elongated members extending from the first support structure. The loading magazine 24 can rotate or index in a circular route to provide the robot 12 easier access to the shafts 22. The elongated members extend through the opening formed by the substrates 14 such that the substrates 14 are positioned about the elongated members. For example, as illustrated in FIG. 1, individual cylindrical substrates 14 are positioned about individual shafts 22 which extend through the open interior defined by the cylindrical shape.

Any suitable transport means for transporting the substrates 14 and collars 16, such as a wheeled flat car, may be utilized in lieu of the conveying systems 18 and 20. The conveyor systems 18 and 20 may employ a belt wrapped about a plurality of rollers rotatably driven by a motor. An example of a suitable conveyor is the Shuttleworth Slip—Torque Accumulation Conveyor manufactured by Shuttleworth ™. The robot 12 may be, for example, the Adept 3 manufactured by Adept Technology ™. Substrates 14 longitudinally extend in a first direction (e.g., vertical) on the conveyor 18 and are transferred to the loading magazine 24 by the robot 12, without changing the orientation thereof. Vertical positioning of the substrates 14 facilitates keeping the substrates 14 stationary, as well as preventing contamination to the sides thereof, when the substrates 14 are positioned on the conveyor 18. Thus, the robot 12 need only perform simple movements to position the substrates 14 onto the loading magazine 24, since time consuming rotational movements of the robot 12 are unnecessary to transfer the substrates 14 as their orientation is not required to be changed. Any suitable mechanical means which can vertically lift and horizontally move the substrates 14 can be employed in lieu of the robot 12.

The robot 12 has an outwardly extending first arm 26 having a proximal end pivotally connected to an upper end of a vertically disposed body 28. An outwardly extending second arm 30 is pivotally connected above a distal end of the first arm 26 and has a suitable gripper 32 at a distal end thereof. The gripper 32 has individual finger members 34 for grasping the substrates 14 and collars 16 off the respective conveying systems 18 and 20. Although not shown, a suitable controller actuates one or more motors to drive movable mechanical parts, which may include pistons, gears, joints, levers, or the like, to move the arms 26 and 30 and the gripper 32 of the robot 12. It should be understood that several robots or one or more robots having a plurality of outwardly extending arms and grippers could be utilized to increase the speed at which the substrates 14 are placed onto the loading magazine 24. It should also be understood that the loading magazine 24 could be manually loaded as well.

In the illustrative example of FIG. 1, the loading magazine 24 provides means for receiving and retaining thereon a member in a first (vertical) direction. The loading magazine 24 can include any mechanism for rotating the shafts 22 and securing a substrate 14 thereon, such as an interior rod-like structure, a rotatable cap, a collet structure (for grasping the exterior surface adjacent an end of the substrate 14), or a rotatable expanding structure (insertable into the substrate 14 for engaging the interior surface of the substrate 14). The loading magazine 24 is disc-shaped, which is particularly adapted for the circular pattern of shafts 22. Similarly, the circular pattern of shafts is particularly adapted to the generally circular arrangement commonly found in typical substrate support carrier units. It should be understood that any suitable shaped base or loading magazine 24 could be utilized and still provide a circular pattern of shafts 22. Similarly, other patterns in arranging the shafts 22 can be provided to correspond to any desired supporting system carrier unit.

Each shaft 22 has an end attached to the loading magazine 24 in a cantilevered arrangement. The shafts 22, disposed in the circular pattern (or planetary arrangement), are capable of carrying at least one substrate 14 (and preferably two substrates 14). The shafts 22 are preferably rotatable and include a plurality of small spring loaded rollers along the sides thereof. Rotatability of the shafts 22 and the presence of spring loaded rollers decreases the surface friction between the shafts 22 and the substrates 14. As a result, the formation of substrate debris, which typically forms when the substrates 14 slide along a non-rotatable shaft, is reduced.

The substrates 14 are loaded onto the shafts 22 of the loading magazine 24, thereby providing a planetary arrangement of substrates 14. Each substrate 14, because of the position of the shafts 22, is parallel to but radially spaced from a central horizontal axis. Preferably, the shafts 22 are located in an annular array at equal radii relative to the central horizontal axis so that the substrates 14 are symmetrically positioned relative to the horizontal axis.

Preferably, the automated loading and unloading system 10 comprises sixteen rotatable shafts 22 carrying two substrates 14 per shaft 22, in which the placement of the substrates 14 and the collars 16 is done in an alternate succession of substrate-collar-substrate upon each shaft 22. Such a system 10 would correspond to a typical sixteen mandrel substrate supporting system. However, any configuration can be formed to match a desired substrate supporting system.

In the substrate-collar-substrate placement, the robot 12 first places a single substrate 14 onto a load ring 36 positioned about a lower end of each of the shafts 22. The robot 12 is then utilized to place a collar 16 about a top end of the previously placed substrate 14. Each collar 16 buffers a lower substrate 14 from a subsequently placed upper substrate 14.

Both the collars 16 and the load rings 36 resemble large "washers" having a ring-like flange along their periphery. This ring-like flange has an inside diameter slightly larger than the outside diameter of the substrate 14, so that the flange forms a collar around an end of the substrate 14 with an inwardly protruding "washer" portion abutting against the end of the substrate 14. The collars 16 and the load rings 36 have an aperture in the "washer" portion that is slightly larger than the outside diameter of the rotatable shaft 22 permitting placement thereabout. In this manner, the collars 16 mask the ends of the substrates 14. The collars 16, because of their transfer concurrently with the substrates 14 into various processing stations, prevent the application of coatings to the end of the substrate 14. Numerous ways of preventing the application of coatings to the substrates 14 exist. For example, in addition to the illustrated collars 16 masking the generally adjacent ends of the adjacent substrates 14, there can be collars 16 masking the free ends of the substrates 14. The masking of the ends of the substrate 14 is generally desired to prevent process coatings from contacting, and thereby, possibly contaminating xerographic components which abut and/or adjoin the substrate 14 ends when the substrates 14 (after process coating) are positioned within an electrophotographic machine. In an alternative collarless (or maskless) system not having collars 16 therein, means could be utilized for handling the substrates 14 to avoid application of processing coatings on the ends of the substrates 14.

Figure 2:
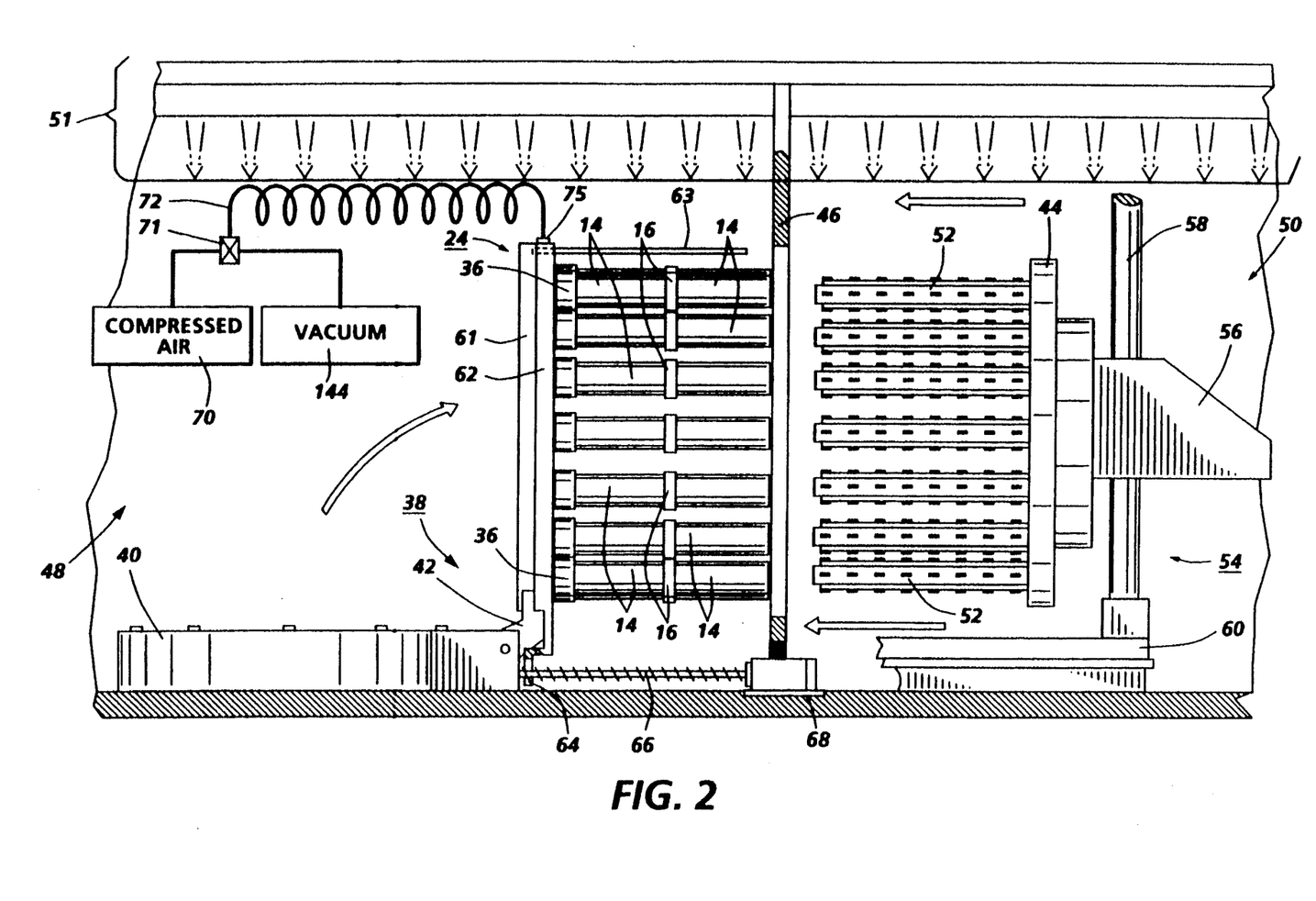
FIG. 2 is a schematic perspective view showing the automated loading and unloading system in alignment with a member supporting system carrier unit for member transfer thereto.

When the loading of all the shafts 22 is complete, a drive and tilt system 38 provides means for changing the orientation of the loading magazine 24, and thereby, the substrates 14 from a first direction to a second direction. The change in the orientation of the substrates 14 places the substrates 14 in alignment to be transferred to a supporting system carrier unit. The drive and tilt system 38 tilts the horizontally disposed loading magazine 24 ninety degrees to an upright position so that the shafts 22 (hidden from view by substrates 14) are horizontally disposed as illustrated in FIG. 2. The loading magazine 24 is pivotally connected to a ground engaging platform 40 by a hinge member 42.

The drive and tilt system 38, thus, provides means for moving or changing the respective orientation of the loading magazine 24 and the the shafts 22 from their respective extensions in one direction to another direction respectively, transverse thereto, preferably perpendicular thereto. In doing so, the orientation of the substrates 14 is changed from their longitudinal extension in the first direction (e.g., vertical) to a second direction (e.g., horizontal), transverse to the first direction, in alignment with a supporting system carrier unit.

Preferably, the loading magazine 24 is rotatable in at least one direction (for example, in the direction of the arrow shown on FIG. 1), facilitating further change in the orientation of the substrates 14. The platform 40 can include a plurality of motor-driven rollers (not shown) arranged in a circular pattern on the upper surface thereof. The loading magazine 24 can include a key generally protruding from a lower surface thereof, extending along in a circular path thereon. The protruding circular key is positioned within a lubricated circular channel in the upper surface of the platform 40 for engagement therewith. The rotation of the rollers on the upper surface causes the loading magazine 24 to rotate in the circular path provided by the channel in the platform 40. Various alternative arrangements exist for rotating the loading magazine 24. For example, the upper surface of the platform 40 could be provided with means to engage the lower surface of the loading magazine 24 to drive the rotation thereof. For instance, motor driven interlocking gears could be positioned on the upper surface of the platform 40 and received by matching gears on the lower surface of the loading magazine 24. The associated motor would operate to drive the rotation of the gears, thereby, effectuating rotation of the loading magazine 24. Alternatively, various mechanical parts, such as rotary pistons, dual shaft pistons and cam arrangements, could be employed to rotate the loading magazine 24.

Within the drive and tilt system 38, electrical power is used to drive electrical equipment, such as motors, solenoids, servo-motors and the like, connected through suitable wiring and conventional switching to provide the pivotal movement of the hinge member 42, and thereby the loading magazine 24. Preferably, one or more members, such as pistons, cams, rotatably driven shafts and threaded rods, etc., are driven by the electrical equipment actuated through suitable circuitry in response to a signal from a conventional programmable controller. For example, the hinge member 42 could be integrally connected to a shaft rotatably driven by a motor for pivoting the loading magazine 24. When actuated, electrical equipment raises and tilts the horizontally disposed loading magazine 24 to orient the loading magazine 24 to a vertical disposition, as illustrated in FIG. 2.

Thus, the control functions in the apparatus of this invention may be synchronized and integrated with any suitable programmable controller (not shown). The programmable controller responds to various typical inputs which may include limit switches, timers, encoders, proximity sensors, counters and the like. Then, the programmable controller utilizes these inputs for sequencing program outputs to activate typical outputs which may include electric switches, solenoid operated valves and the like. Thus, the termination of an activated component within the loading and unloading system 10 may be accomplished by any suitable and conventional means and is preferably effected by a programmable controller and/or a plurality of limit switches.

Once the loading magazine 24 is vertically disposed, the system 10 is now ready to transfer (load) the substrates 14 onto second receiving and retaining means. The second receiving and retaining means may comprise a second support structure such as the member supporting system carrier unit 44, or the plurality of elongated members which extend therefrom. The loading and unloading system 10 includes suitable means for simultaneously or substantially simultaneously transferring at least one member, i.e., the substrate(s) 14, disposed in the second (horizontal) direction from the loading magazine 24 to the carrier unit 44.

Although both the loading and unloading system 10 and the carrier unit 44 may be in the same room, it is expected that the units will be in a separate room to maintain the atmospheric integrity of each room. In the present embodiment, the loading magazine 24 transfers the substrates 14 through a wall 46 from a loading room 48 to a processing room 50, as illustrated in FIG. 2. Both the rooms 48 and 50 provide laminar air flow 51 therein to prevent substrate 14 contamination that might otherwise occur. The substrate carrier unit 44 functions to transfer the substrates 14 to the various processing modules in the processing room 50.

Preferably, the wall 46 has suitable means of maintaining atmospheric integrity between the rooms 48 and 50. Maintaining the atmospheric integrity is desirable so as to preserve contaminant particle control and pressure balance between the rooms 48 and 50. For example, a single retractable cover could be provided to cover an aperture (sized to allow simultaneous or substantially simultaneous passage of a plurality of the substrates 14) in the wall 46 between the rooms 48 and 50. Retracting the cover would allow generally instantaneous passage of the plurality of the substrates 14. Alternatively, a plurality of retractable covered apertures (individually sized to allow passage of a single substrate 14 at a time) in a corresponding planetary arrangement matching both the loading magazine 24 and the carrier unit 44 could be provided. An associated cover for each aperture then could be retracted to permit generally instantaneous passage of a single substrate 14 through one of such plurality of apertures in the wall 46.

As illustrated in FIG. 2, the carrier unit 44 includes a plurality of spaced apart elongated members in the form of a planetary array of roller mandrel support arms 52. Each support arm 52 defines an offset horizontal axis radially spaced from a central horizontal axis of the carrier unit 44. Each support arm 52 is capable of carrying at least one substrate 14 (and preferably two or more substrates 14) so that the carrier unit 44 provides a planetary arrangement of substrates 14, each substrate 14 being parallel and radially spaced from the central horizontal axis.

Figure 3:
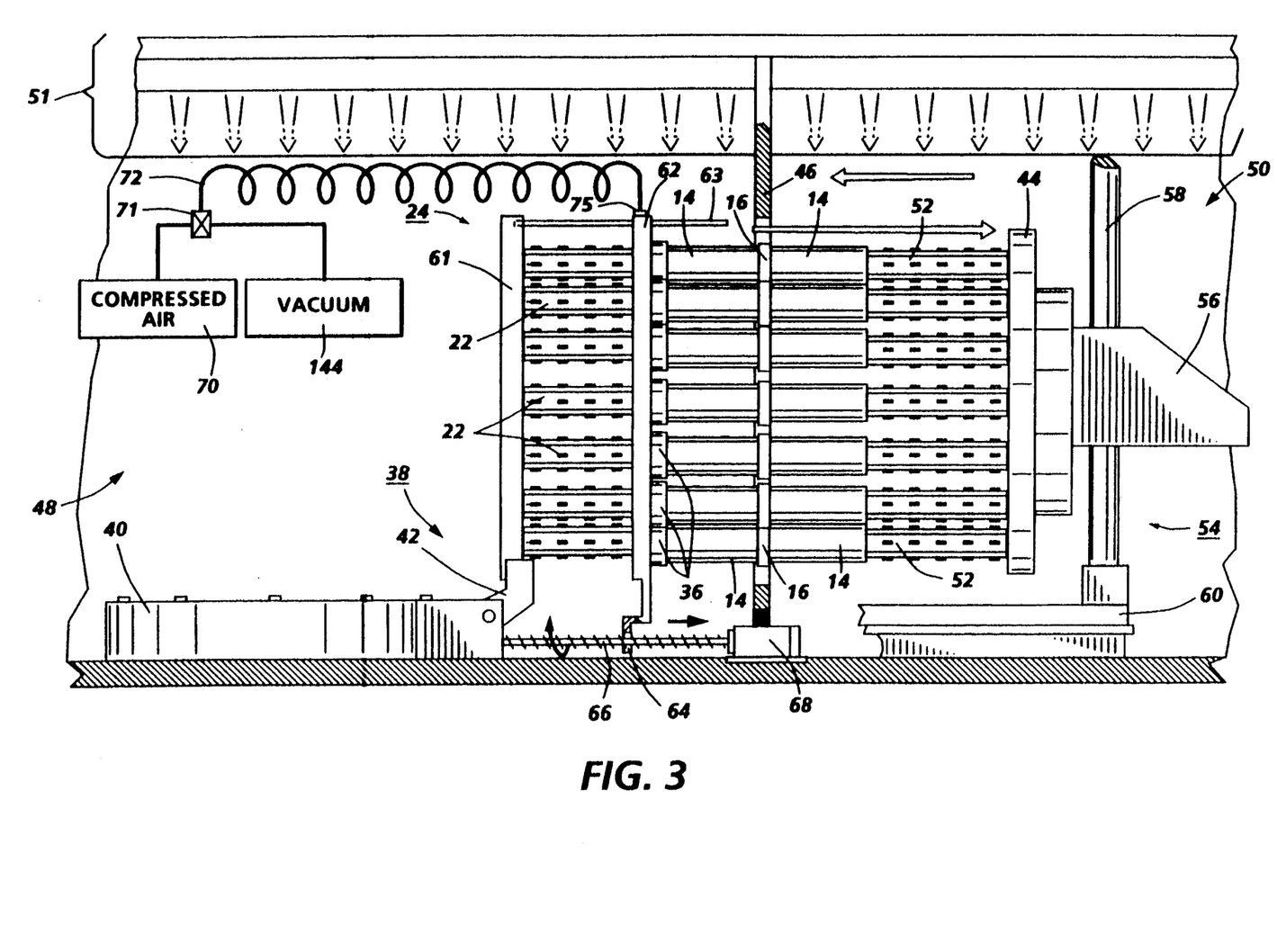
FIG. 3 is a schematic perspective view showing the automated loading and unloading system transferring members to the member supporting system carrier unit.

Preferably, the support arms 52 are located in an annular array at equal radii relative to the central horizontal axis so that the substrates 14 are symmetrically positioned relative to the horizontal axis. The support arms 52 may, but need not, orbit or revolve about the central horizontal axis; the term "planetary" is intended to mean that the support arms 52 surround the central horizontal axis. However, the carrier unit 44 carries a mechanism for rotating each support arm 52 about its offset horizontal axis so that each substrate 14 in the planetary arrangement of substrates 14 rotates about its offset horizontal axis while being secured in a position parallel to but radially spaced from the central horizontal axis. The carrier unit 44 can include any suitable mechanism for rotating the support arm 52 and securing a substrate 14 along the offset horizontal axis, such as an interior rod-like structure, a rotatable cap, a collet structure (for grasping the exterior surface of an end of the substrate 14), or a rotatable expanding structure (insertable into the substrate 14 for grasping the interior surface of the substrate 14). Further, while the substrates 14 can all have the same diameter (e.g., 84 mm.), as illustrated in FIGS. 1-3, the support arms 52, as well as the shafts 22, are capable of supporting substrates 14 of different diameters (e.g., 30 to 400 mm.). The range of diameter sizes of the substrates 14 is dependent in part on the spacing of the support arms 52 or the shafts 22, and large sized diameter substrates 14 may limit the number of support arms 52 on the carrier unit 44, or the number of shafts 22 on the loading magazine 24, that may be employed.

The planetary arrangement of substrates 14 on the carrier unit 44 permits a large number of substrates 14 to be processed simultaneously, thereby increasing the throughput of the process and decreasing manufacturing costs. Each support arm 52 can carry multiple substrates 14, and simple adjustments and/or modifications permit processing of substrates 14 of varying diameters. Further, the coating and curing stations described below can perform their operations from the central axis radially outward while each substrate 14 rotates about its offset axis, so that each substrate 14 is processed in an equal number due to the radial symmetry, thus ensuring uniformity and versatility in processing.

The substrates 14 may be positioned on associated support arms 52 during only a single processing operation and thereafter removed from the support arms 52. Alternatively, the substrates 14 may remain positioned on the support arms 52 for additional processing operations. The mandrel supported substrates 14 may remain at a single location for different processing treatments, or be moved to one or more different locations for further processing. In either case, the appropriate application of coatings to the substrates 14 can transform the substrates 14 into photoreceptors. Multiple processing operations may be conducted while the substrates 14 remain supported on support arms 52, or processed substrates 14 may be removed and additional unprocessed substrates 14 may be mounted onto support arms 52 for processing. Thus, the support arms 52 may be transported with the substrates 14 to another location for further processing of the processed substrates 14 supported thereon, and other support arms 52, carrying unprocessed substrates 14, may be moved into position for processing. Alternatively, after the removal of a processed substrate 14, the original support arms 52 may be used again to support new unprocessed substrates 14 for cleaning.

An X-Y-Z point-to-point servo system 54 permits movement of the carrier unit 44 toward and away from any desired location. The carrier unit 44 is releasably mounted to a support member 56, which is positioned about and engages a vertical transport bar 58 of the servo system 54. Typically, the support member 56 includes outwardly protruding generally L-shaped members adapted to receive corresponding protruding rods of the carrier unit 44. The carrier unit 44 is positioned on the support member 56, and then rotated until the protruding rods are received by the L-shaped members, thereby, locking the carrier unit 44 to the support member 56. The vertical transport bar 58 has suitable means for raising a support member 56, such as utilizing intermeshing gears (preferably motor driven) in both the bar 58 and the support member 56. The carrier unit 44 is releasably attached to the support member 56. By raising the support member 56, the substrates 14 positioned on the carrier unit 44 can be raised to any desired height. The vertically disposed bar 58 extends downward to a multi-horizontal directional wheeled base 60. The base 60 can have a suitable motor to drive the wheels on the base 60 to permit movement thereof. The base 60 can be driven along a track in the floor of the room for more controlled movements if desired. Motors, valves and switches within the servo system 54 are actuated by a suitable controller in the manner hereinbefore described with respect to the loading and unloading system 10. The servo system 54 moves the carrier unit 44 toward and in alignment with the loading magazine 24 during loading and unloading of the substrates 14. Preferably, the carrier unit 44 is positioned so that the support arms 52 are on the verge of abutting end-to-end with the shafts 22.

The transfer of the substrates 14 to the carrier unit 44 can be performed in a variety of ways. Preferably, the loading magazine 24 includes a fixed base portion 61 and a detachable and drivable disc-shaped manifold 62. The manifold 62 has each of the load rings 36 and the shafts 22 extending outwardly therefrom. An outwardly extending longitudinal guide bar 63, disposed horizontally during substrate 14 transfer, is mounted to a sidewardly facing surface of the base portion 61 near the upper rounded surface thereof. The guide bar 63 is adapted to be inserted through the aperture of the manifold 62 to provide both support and means to guide sideward movement of the manifold 62. A suitable lubricant is placed on the guide bar 63 to facilitate movement of the manifold 62 therealong.

To obtain the sideward movement of the manifold 62, the manifold 62 could have an open ended grooved member 64 extending from the rounded exterior of the disc-shaped manifold 62. (A system in which the loading magazine 24 is rotatable requires the length of the groove member 64 to be of sufficient size to be functional, but not so large as to interfere with the loading magazine 24 rotation.) When the loading magazine 24 is vertically disposed, the open end of the grooved member 64 would receive a rotatable threaded screw 66 extending horizontally along its longitudinal axis and disposed between the platform 40 and the carrier unit 44. The grooves of the member 64 would be adapted to mesh with corresponding threads on the rotatable screw 66. The rotatable screw 66 could be rotatably driven by a small compact motor 68. The motor 68 is effectively positioned, such as adjacent or integral with the wall 46, to provide the greatest range of motion of the manifold 62. As the motor 68 drives the rotation of the screw 66, the interaction of the threads on the screw 66 and the grooves on the grooved member 64 would urge the grooved member 64 in sideward movement as illustrated in FIG. 3. The urging of the grooved member 64 would, in turn, urge the manifold 62 from the base portion 61 of the loading magazine 24 to drive the manifold 62 towards the carrier unit 44. The carrier unit 44, in turn, is moved toward the loading and unloading system 10 through the operation of the wheeled base 60. Alternatively, the sideward movement of the loading magazine 24 or the manifold 62 thereof could be achieved by using a servo system including a wheeled base to permit movement of the loading magazine 24 toward and away from any desired location.

The carrier unit 44 and the loading and unloading system 10, thus, become positioned in close proximity to one another, each adjacent to the apertures in the wall 46. If desired, either the shafts 22 or the support arms 52 can extend through the apertures of the wall 46 to facilitate substrate 14 transfer. As previously discussed, the carrier unit 44 includes a planetary array of mandrel support arms 52, each defining an offset horizontal axis radially spaced from a central horizontal axis of the carrier unit 44. When the manifold 62 is urged toward the carrier unit 44, with the substrates 14 in alignment to be received by the roller mandrel support arms 52 of the carrier unit 44, the substrates 14 are urged off of the shafts 22 through the aperture(s) in the wall 46 and onto the support arms 52 by the momentum caused by the movement of the manifold 62.

Generally, the momentum caused by the movement of the manifold 62 is insufficient to place an entire substrate 14 onto a support arm 52. Thus, it is generally desirable to place a locking mechanism on the support arms 52 (as well as the shafts 22 when the substrates 14 are positioned thereon) to maintain the substrate 14 fixed thereon, even though the substrate 14 is not completely on the support arm 52. One such locking mechanism could employ an extendably and retractably protruding member which, upon activation, could protrude outward from the exterior surface of the support arm 52 to engage the interior surface of the substrate 14 to secure the substrate 14 onto the support arm 52. The support arm 52 preferably includes an outwardly extending activating member at the distal end. The activating member would be adapted to abut an end of the shaft 22. The activating member, upon such abutting contact, would retract causing the activation (or protrusion) of the protruding member through a suitable lever arrangement with or without a motor in combination therewith.

Alternatively, as FIG. 2 indicates, the drivable disc-shaped manifold 62 could have a plurality of apertures therein. The manifold 62 could be connected to a compressed air source 70 to force or blow air outward from the manifold 62 through the plurality of apertures to facilitate the urging of the substrates 14. A three-way pressure valve 71 regulates the flow of compressed air through a tube 72 as well as providing a shut-off means for the flow therein. The three-way valve 71 also allows the manifold 62 access to an additional source through the tube 72. Any suitable flexible tube 72, formed of an elastomeric material, such as rubber, could connect the compressed air source 70 to the manifold 62. The flexibility in the tube 72 would increase durability thereof, and is necessitated by the continual bending caused by the drive and tilt system 38 elevationally tilting the loading magazine 24. Preferably, a plurality of apertures within the manifold 62 would be aligned with each rim of the substrates 14 so as to direct air against the substrates 14, as opposed to through an opening formed by the interior surface of the substrates 14. In this manner, the substrates 14 could be urged off of the shafts 22 and onto the support arms 52.

The use of a compressed air source 70 may be utilized in combination with the embodiment described above utilizing the threaded groove member 64 urged sideward through the rotation of the motor-driven screw 66. The use of compressed air against the substrates 14 would provide a more gradual urging of the substrates 14 onto the support arms 52 then might otherwise be accomplished by urging provided solely by the momentum of the manifold 62. However, means to prevent contaminant particle flow may be required if the use of a compressed air source substantially increases the contaminant particle flow.

Figure 4A:
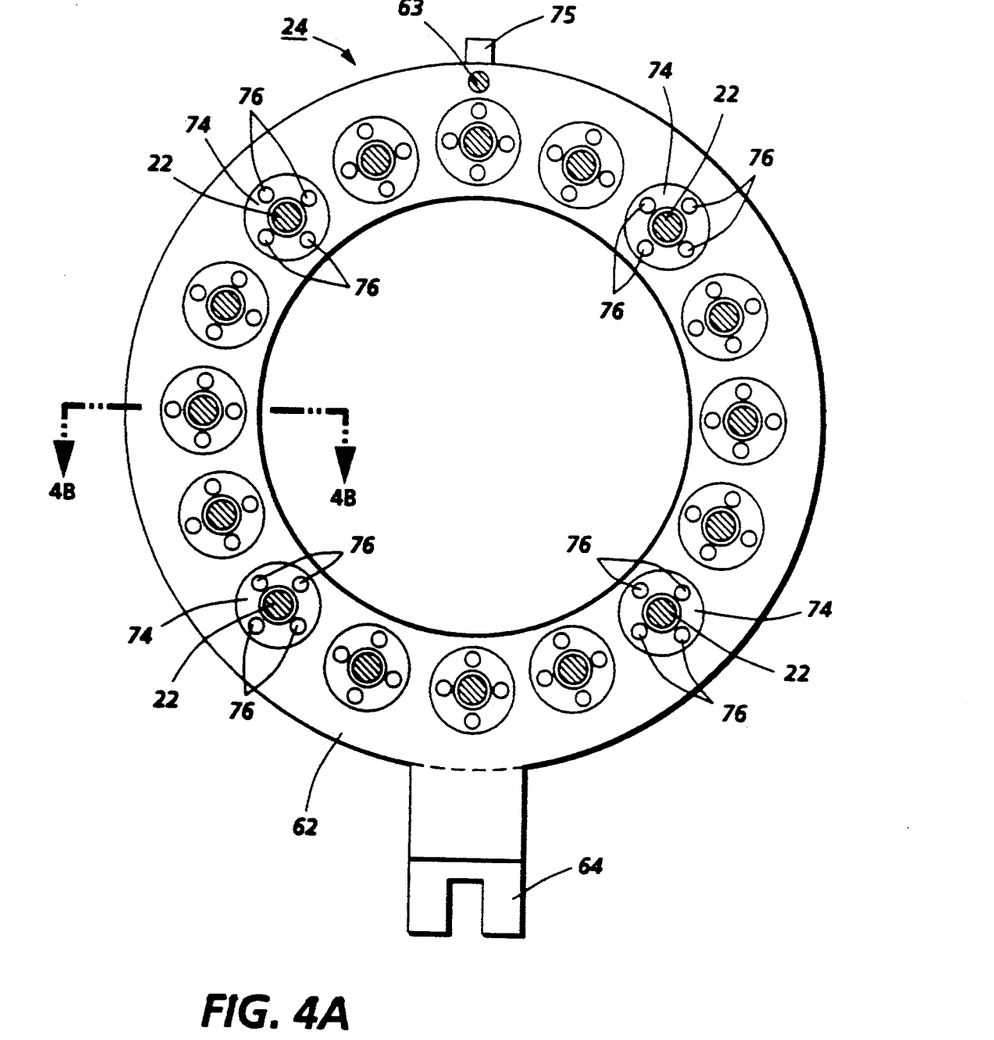
FIG. 4A is a cross-sectional view of the loading magazine of the automated loading and unloading system.
Figure 4B:
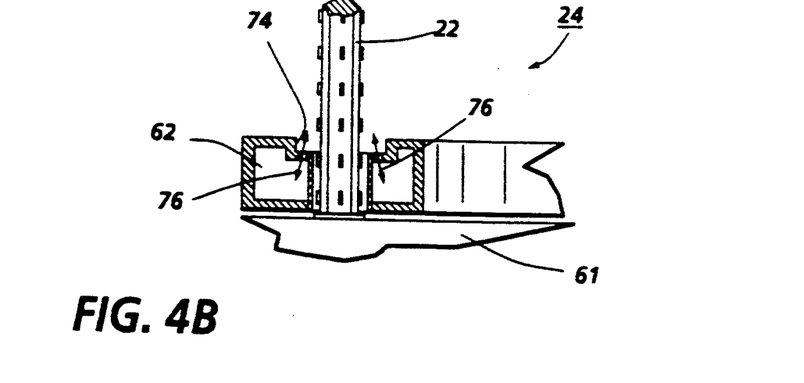
FIG. 4B is a schematic view along line 4B–4B on FIG. 4A.

FIG. 4A illustrates how such an embodiment would function. The manifold 62 has the plurality of circular recesses 74 having a diameter slightly larger than the outer surface (defining the outer circumference) of the substrates 14. Within the recesses 74, four apertures 76, although any suitable number can be utilized, are disposed therein and provide an outlet of the compressed air within the manifold 62 and then against the substrates 14. An orifice 75 at an upper surface of the manifold 62 provides an inlet for the compressed air from the source 70 via the tube 72. Also within each recess 74 is a shaft 22 centrally positioned therein, which extends outward from the recess 74. FIG. 4B provides a partial sectional view of one recess 74 and a shaft 22 outwardly extending therefrom to provide greater understanding. When a substrate 14 is positioned on the shaft 22, an end of the substrate 14 is positioned within the recess 74 such that the outer rim of the substrate 14 is aligned with the apertures 76. Thus, the compressed air can be forced against the substrates 14 to facilitate the urging thereof. The primary urging force on the substrates 14 remains, however, the momentum generated by the movement of the manifold 62 along the guide bar 63.

A variation on the previous alternative manner of transferring the substrates 14 would be to have each load ring 36 individually interconnected and drivable by the rotation of the screw 66 or a plurality of associated screws. Each load ring 36 would then move outward from the loading magazine 24 to urge the substrates 14 as opposed to the manifold 62 moving the substrates 14. The use of a compressed air source 70 could facilitate transfer in this manner of transfer as well. In another variation of the loading and unloading system 10, instead of moving the load rings 36, the shafts 22 could be extendible and retractable to urge the substrates 14 onto the support arms 52.

Another alternative manner of substrate 14 transfer could modify the loading and unloading system 10 and utilize a rotational driving force, such as motor driven wheels, integral with an exterior surface of each of the shafts 22. The motor driven wheels, adapted to engage an interior surface of the substrate 14, would rotate to effectuate movement of the substrate 14 along the shaft 22 and onto the support arms 52. After transfer to the carrier unit 44, the servo system 54 would advance the carrier unit 44 to the individual processing stations.

Once the substrates 14 are positioned on the carrier units 44, the substrates 14 thereon can be simultaneously or substantially simultaneously transferred or inserted into a processing module for processing. A variety of methods exist for processing the substrates, U.S. Pat. No. 5,032,052 to Swain and U.S. Pat. No. 5,038,707 to Swain et al., each disclose preferable methods for processing the substrates 14, and the relevant portions thereof are incorporated herein by reference thereto.

Figure 5:
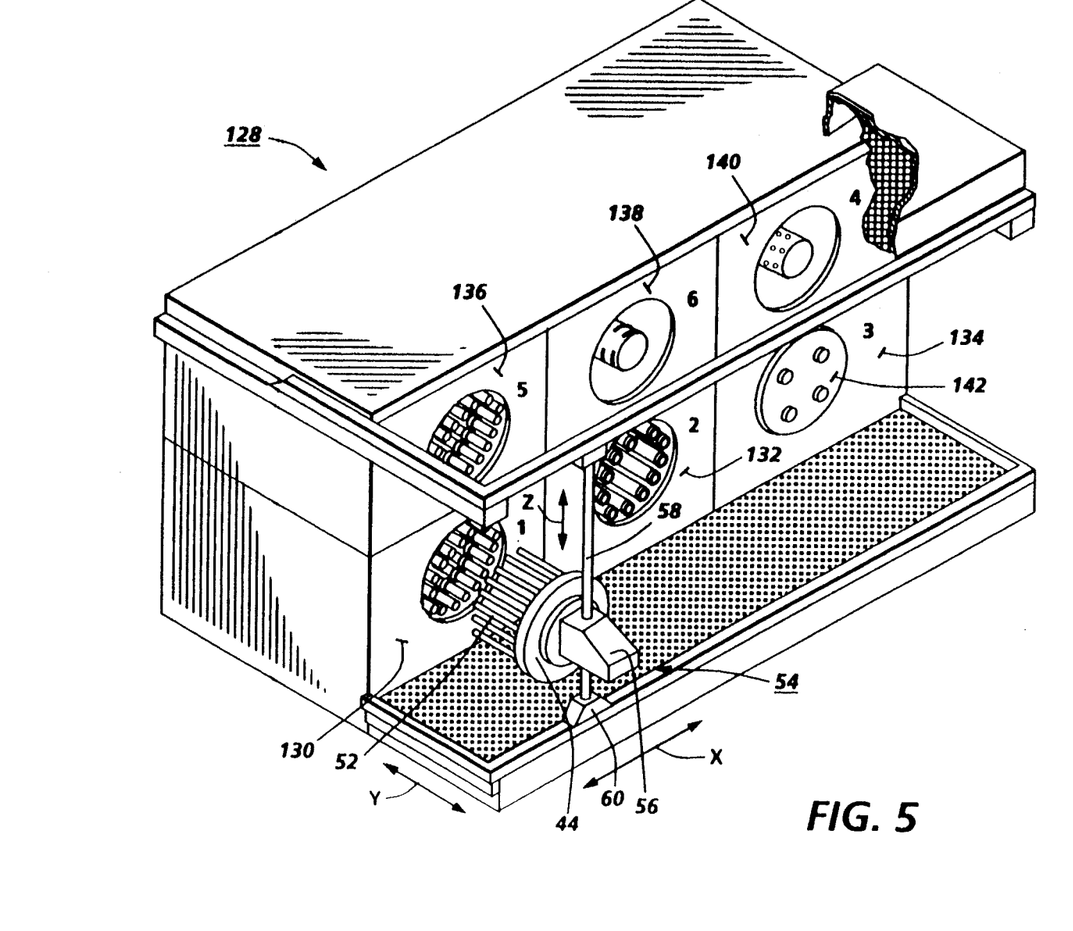
FIG. 5 is a schematic perspective view showing the member supporting system carrier unit in alignment with a panel having processing modules for receiving the members therein.

The individual processing stations are preferably in close proximity to the carrier unit 44. The basic processing steps may include loading, cleaning, coating, and drying substrates 14. One arrangement of processing stations is illustrated in FIG. 5 in which a processing panel 128 has three processing modules 130, 132, 134 on a lower level and three modules 136, 138, 140 on an upper level with each upper module above one lower module. The six modules 130, 132, 134, 136, 138 and 140 may include pairs of cleaning, coating and drying stations or single cleaning, coating and drying stations and three other desired processing stations. The plurality of processing stations allows simultaneous processing using more than one carrier unit. It should be understood that any desired number and arrangement of processing stations can be used.

The X-Y-Z point-to-point servo system 54 permits movement of the carrier unit 44 toward and away from any desired location to enable the carrier unit 44 to simultaneously transfer the substrates 14 to a selected processing module. The carrier unit 44 is releasably mounted to a support member 56, to permit the entire carrier unit 44 to be inserted into a processing module in one example of simultaneous substrate transfer. The carrier unit 44 can be adapted to transfer the substrates 14 in accordance with any known method including previously described methods with respect to substrate transfer to the carrier unit 44 from the loading magazine 24.

In the following processing progression, the carrier unit 44 is inserted within the modules 130, 136, and 132 and contemplates using a second carrier unit 142 illustrated within the module 134 for insertion within the modules 138 and 140 as well. If a single carrier unit is utilized and each processing module performs a separate function, then the carrier unit 44 is transported to processing modules in the progression according to the designations 1-6 on the processing modules 130, 132, 134, 136, 138 and 140, respectively, in FIG. 5.

Cleaning of substrates 14 may be performed at a cleaning station within the module 130. The carrier unit 44 is advanced by the servo track system 54 toward the cleaning module 130 to insert the planetary array of substrates 14 therein. When the carrier unit 44 closes against the open end of the cleaning module 130, a sealing mechanism (not shown) seals the cleaning module 130 with substrates 14 loaded therein. Once inside the cleaning module 130, substrates 14 are cleaned by any suitable technique, such as the utilization of liquid detergents, carbon dioxide, freon, or ozone with or without simultaneous exposure to ultraviolet light. The substrates 14 are rotated on their support arms 52 about their horizontal axes during the cleaning operation so that each substrate 14 is cleaned uniformly over its entire exterior surface. The free ends of the support arms 52 may be supported by bearing blocks (not shown) during rotation. Rotation of each support arm 52 may be effected by any suitable means, such as an electric motor (not shown) connected thereto by suitable gear means. The atmosphere in the cleaning module 130 may then be exhausted and the substrates 14 withdrawn from the cleaning module 130 by reverse retraction of the carrier unit 44.

Substrates 14 may be coated at a coating station within the module 136. The carrier unit 44 is advanced to insert the planetary array into a coating module 136 with a sealing mechanism sealing the module 136. Then, the substrates 14 are coated using a solvent/polymer solution expelled from an electrostatic rotary atomizer which may be any suitable commercially available device, such as a DEVILBISS™, AEROBELL™, GRACO™ CA 1000, CT 4000 or Resistive Micro-Bell rotary atomizers. The coating solution preferably contains one or more materials useful, for example, in electrophotography. The planetary arrangement of horizontal substrates 14 surrounds a reciprocating path of an electrostatic rotary atomizer to assure uniform coating. When the coating process is complete, the substrates 14 are withdrawn from the coating module 136 by retraction (reverse reciprocation) of the carrier unit 44.

Drying of substrates 14 may be performed at a curing station within the module 132. The carrier unit 44 is advanced to insert the planetary array of substrates 14 into the curing station module 132. The curing station module 132 includes a drying mechanism to remove solvent from the freshly coated film on substrates 14 by exposing them to a heated stream of high velocity air as the substrates 14 rotate. The drying mechanism may include a source of air and heating source to control the temperature of an air entering inlet. The high velocity air minimizes a boundary layer, and the resultant high heat and mass transfer rates permit rapid solvent removal. When the coated layer is cured adequately, the air supply temperature is lowered to below ambient temperature to rapidly cool the substrates 14 to ambient temperature. Then, the carrier unit 44 returns the planetary array of substrates 14 to another processing station, such as in modules 134, 138, or 140 or an unloading station, which may be the original loading station, for unloading the coated substrates 14, now suitable for use as photoreceptors.

The unloading process can be performed in a variety of ways including those transfer methods discussed with respect to the loading process. A vacuum source 144, as illustrated in FIGS. 2 and 3, could be connected to the tube 72 and regulated by the valve 71 to create a vacuum in the manifold 62. Air would be pulled through the apertures 76 in the manifold 62 causing the air to urge the substrates 14, thereby, vacuum-pulling the substrates 14 onto the shafts 22. A suction cup or gripper, suitably connected to the vacuum source, could also be utilized to grasp the substrates 14 to facilitate the urging thereof. The rotatable screw 66 could then be driven in an opposite direction to urge the manifold 62 and substrates 14 towards a desired stationary position. One difficulty with such a system is that the use of a vacuum source may cause nearby contaminants to be drawn onto the substrates 14. Thus, either a means for contaminant particle control or the substantial elimination of contaminants would be a desired prerequisite for such a system.

Alternatively, the carrier unit 44 could be provided with urging means, such as its own compressed air source and an associated rotatably driven screw, to urge a detached manifold thereof to unload the substrates 14 onto the loading and unloading system 10 in a reciprocal process. Such a reciprocal process would operate in the same general fashion as previously described with respect to the loading and unloading system 10.

Also, the mandrel support arms 52 could utilize a rotational driving force, such as motor driven wheels, integral with an exterior surface thereof. The motor driven wheels, adapted to engage an interior surface of the substrate 14, would rotate to effectuate movement of the substrate 14 along the support arm 52 and onto the shaft 22.

After the coated substrates 14, suitable for use as photoreceptors, are transferred to the automated loading and unloading system 10, the drive and tilt system 38 can reorient the loading magazine 24 to reorient the substrates 14 from a horizontal disposition to a vertical disposition in the same manner as previously described with respect to the loading process. The loading magazine 24, with coated substrates 14 positioned on the shafts 22 thereof, returns to a desired position, such as its initial position. The coated substrates 14 can then be removed by any suitable means, including the use of robotics. For example, the robot 12, in combination with a suitable end effecter, could be utilized for grasping and urging the substrates 14 off of the shafts 22. It should be understood that in both the loading and the unloading processes the automated loading and unloading system 10 can receive the substrates 14 from any one direction, and reorient the substrates 14 to another direction and is not limited solely to vertical and horizontal directions or the directions from which substrate 14 have previously been received from and transferred to.

Any suitable substrate 14 may be loaded and unloaded using the apparatus and process of this invention. The substrate 14 may comprise a single layer or a plurality of layers in which the layers comprise suitable plastic and/or, metallic materials. Typical plastic materials include polyethylenes, polypropylenes, polycarbonates, polyvinylacetate, terephthalic acid resins, polyvinylchloride, styrene-butadiene co-polymers, vinyl esters and the like. Typical metallic materials include aluminum, stainless steel, brass, titanium, nickel and the like. The sleeve substrate 14 may be of any suitable thickness which will allow cleaning without collapsing or cracking. Preferred sleeve thicknesses, for use with the shafts 22 and the support arms 52, can range from between about 0.1 millimeter to about 6 millimeters. Thicker substrates 14 may be utilized as long as sufficient support can be provided by the roller shafts 22 and the mandrel support arms 52. Substrates 14 having a thickness up to about 12 centimeters may be loaded and unloaded with the process and apparatus of this invention.

The materials used to form the loading/unloading system 10 (including the roller shaft 22, loading magazine 24, and load rings 36), the collars 16, and the carrier units 44 are preferably anticorrosive materials, such as stainless steel or aluminum with teflon coating.

In recapitulation, it is evident that the automated loading and unloading system of the present invention receives and retains substrates, reorients the substrates from a first direction to a second direction, and simultaneously or substantially simultaneously transfers the substrates to a supporting carrier unit. The supporting carrier unit, in turn simultaneously or substantially simultaneously transfers the substrates to a processing module. The automated loading and unloading system also is capable of receiving the coated substrates, formed into photoreceptors, returned from the carrier unit in the second direction and reorienting the substrates to the first direction. The system provides an efficient method of loading substrates and unloading photoreceptors which can be utilized in a rotary manufacturing system.

It can be seen that the loading and unloading system action can be accomplished in approximately 5 to 10 seconds or less, thereby, reducing the total loading time including docking of the carrier unit to less than 30 seconds. This minimal cycle time is quite important especially at shift startup since the system can be quickly filled with substrates which will result in higher system efficiency. In addition, by eliminating manual loading of the carrier unit, a contaminant free environment can be more readily achieved and maintained.

What is claimed is:

1. A system for loading a plurality of cylindrical members, initially oriented to longitudinally extend in a first direction, into a processing module adapted to receive the plurality of cylindrical members longitudinally extending in a second direction, comprising:

first means, oriented in a first position, for receiving and retaining removably thereon the plurality of cylindrical members oriented to longitudinally extend in the first direction, wherein the first receiving and retaining means includes a plurality of spaced apart elongated members and wherein all the members are substantially parallel with each other in longitudinal orientation;

second means for receiving and retaining removably thereon the plurality of cylindrical members oriented to longitudinally extend in a substantially horizontal direction, wherein the second receiving and retaining means includes a plurality of spaced apart elongated members and a base member defining a surface, and wherein the plurality of the members extends from only the surface;

first means for transferring the plurality of cylindrical members, longitudinally extending in the first direction, to said first receiving and retaining means;

means for moving said first receiving and retaining means from the first position to a second position, said first receiving and retaining means, in the first position, orienting the plurality of cylindrical members to longitudinally extend in the first direction, said first receiving and retaining means, in the second position, orienting the plurality of cylindrical members to longitudinally extend in a substantially horizontal second direction, transverse to the first direction, in alignment with said second receiving and retaining means;

second means for transferring substantially simultaneously the plurality of cylindrical members from said first receiving and retaining means to said second receiving and retaining means, wherein said second transferring means moves said first receiving and retaining means in the second direction to adjust the position of said first receiving and retaining means relative to said second receiving and retaining means; and third means for transferring substantially simultaneously the plurality of cylindrical members received and retained by said second receiving and retaining means to the processing module.

2. A system according to claim 1, wherein each one of said plurality of spaced apart elongated members of said first receiving and retaining means is adapted to receive one of the cylindrical members thereon.

3. A system according to claim 2, wherein each one of said plurality of spaced apart elongated members of said second receiving and retaining means is adapted to receive one of the cylindrical members thereon.

4. A system according to claim 1, wherein the first direction is substantially vertical.

5. A system according to claim 1, wherein the second direction is substantially horizontal.

6. A system according to claim 1, wherein the first direction is substantially perpendicular to the second direction.

7. A system according to claim 1, wherein said moving means adjusts the elevation of the plurality of cylindrical members.

8. A system according to claim 1, wherein said first transferring means transfers the plurality of cylindrical members without reorienting the plurality of cylindrical members extending substantially in the first direction.

9. A system according to claim 1, wherein said moving means pivots said first receiving and retaining means from the first position to the second position.

10. A system according to claim 1, further comprising transporting means for transporting the plurality of cylindrical members generally adjacent said first receiving and retaining means, said first transferring means transferring the plurality of cylindrical members from said transporting means to said first receiving and retaining means.

11. A system according to claim 1, wherein said moving means comprises means for pivoting said first receiving means.

12. A system according to claim 1, wherein said first transferring means comprises a robot.

13. A system according to claim 1, wherein said second transferring means comprises:
a rotatably driven member integral with said first receiving and retaining means; and
means for rotatably driving said rotatably driven member to move said first receiving and retaining means relative to said second receiving and retaining means.

14. A system according to claim 1, wherein said first receiving and retaining means comprises a movable portion and a fixed portion, said second transferring means moves said movable portion relative to said fixed portion to urge the plurality of cylindrical members onto said second receiving and retaining means.

15. A system according to claim 1, wherein said third transferring means includes a wheeled support structure, said second receiving and retaining means being mounted to said wheeled support structure, said wheeled support structure moving said second receiving and retaining means into the processing module.

16. A system according to claim 15, wherein said second receiving and retaining means is detachably mounted to said wheeled support structure, said wheeled support structure moving said second receiving and retaining means into the processing module and detaching said second receiving and retaining means from said wheeled support structure.

17. A system for loading a plurality of cylindrical members, initially oriented to longitudinally extend in a first direction, into a processing module adapted to receive the plurality of cylindrical members longitudinally extending in a second direction, comprising:
first means, oriented in a first position, for receiving and retaining removably thereon the plurality of cylindrical members oriented to longitudinally extend in the first direction;
second means for receiving and retaining removably thereon the plurality of cylindrical members oriented to longitudinally extend in a substantially horizontal direction;
first means for transferring the plurality of cylindrical members, longitudinally extending in the first direction, to said first receiving and retaining means;
means for moving said first receiving and retaining means from the first position to a second position, said first receiving and retaining means, in the first position, orienting the plurality of cylindrical members to longitudinally extend in the first direction, said first receiving and retaining means, in the second position, orienting the plurality of cylindrical members to longitudinally extend in a substantially horizontal second direction, transverse to the first direction, in alignment with said second receiving and retaining means;
second means for transferring substantially simultaneously the plurality of cylindrical members from said first receiving and retaining means to said second receiving and retaining means, wherein said second transferring means moves said first receiving and retaining means in the second direction to adjust the position of said first receiving and retaining means relative to said second receiving and retaining means; and
third means for transferring substantially simultaneously the plurality of cylindrical members received and retained by said second receiving and retaining means to the processing module, wherein said first receiving and retaining means and said second receiving and retaining means each includes a plurality of spaced apart elongated members arranged in a circular pattern.

* * * * *